US012513685B2

(12) United States Patent
Zhao et al.

(10) Patent No.: US 12,513,685 B2
(45) Date of Patent: Dec. 30, 2025

(54) DATA TRANSMISSION METHOD, ELECTRONIC DEVICE, AND STORAGE MEDIUM

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 532 days.

(21) Appl. No.: 17/664,984

(22) Filed: May 25, 2022

(65) Prior Publication Data

US 2022/0287047 A1 Sep. 8, 2022

Related U.S. Application Data

(63) Continuation of application No. PCT/CN2020/072525, filed on Jan. 16, 2020.

(51) Int. Cl.
*H04W 72/121* (2023.01)
*H04L 1/1812* (2023.01)
*H04W 72/1273* (2023.01)

(52) U.S. Cl.
CPC ..... *H04W 72/121* (2013.01); *H04W 72/1273* (2013.01); *H04L 1/1812* (2013.01)

(58) Field of Classification Search
CPC ............... H04L 1/1812; H04L 5/0048; H04L 5/0051; H04W 72/121; H04W 72/1273; H04W 72/30
See application file for complete search history.

(56) References Cited

U.S. PATENT DOCUMENTS

| 9,496,972 B2* | 11/2016 | Wu | H04W 72/30 |
| 12,101,727 B2* | 9/2024 | Kim | H04W 40/16 |
| 2015/0029874 A1 | 1/2015 | Davydov et al. | |
| 2019/0045488 A1 | 2/2019 | Park et al. | |
| 2019/0223204 A1 | 7/2019 | Kim et al. | |
| 2019/0260532 A1* | 8/2019 | Manolakos | H04L 5/0051 |
| 2020/0052943 A1* | 2/2020 | Jassal | H04B 17/104 |

(Continued)

FOREIGN PATENT DOCUMENTS

| CN | 107786947 A | 3/2018 |
| CN | 109474391 A | 3/2019 |

(Continued)

OTHER PUBLICATIONS

First Office Action of the European application No. 20914098.7, issued on Jul. 17, 2023. 5 pages.

(Continued)

*Primary Examiner* — Marcus Smith
*Assistant Examiner* — Kai Chang
(74) *Attorney, Agent, or Firm* — PERKINS COIE LLP

(57) ABSTRACT

Disclosed is a data transmission method, comprising: when a first condition is met, a terminal device simultaneously receiving first data and second data, wherein the first data is carried on a first physical downlink shared channel (PDSCH); and the second data is carried on a second PDSCH. Further disclosed are an electronic device and a storage medium.

17 Claims, 4 Drawing Sheets

(56) References Cited

U.S. PATENT DOCUMENTS

| | | | |
|---|---|---|---|
| 2020/0260475 A1* | 8/2020 | Yoshimura | H04L 27/26025 |
| 2020/0314880 A1* | 10/2020 | Cirik | H04W 72/53 |
| 2020/0396760 A1* | 12/2020 | Yi | H04W 72/23 |
| 2021/0258940 A1 | 8/2021 | Kim et al. | |
| 2021/0337584 A1* | 10/2021 | Zhang | H04L 5/0051 |
| 2022/0006582 A1* | 1/2022 | Yamada | H04W 72/1273 |
| 2022/0225120 A1* | 7/2022 | Matsumura | H04L 5/0023 |
| 2022/0394617 A1* | 12/2022 | Li | H04W 52/0235 |

FOREIGN PATENT DOCUMENTS

| | | | |
|---|---|---|---|
| CN | 109474403 A | 3/2019 | |
| CN | 109475002 A | 3/2019 | |
| CN | 109842936 A | 6/2019 | |
| CN | 110380827 A | 10/2019 | |
| CN | 110583085 A | 12/2019 | |
| CN | 110663282 A | 1/2020 | |
| WO | 2019235906 A1 | 12/2019 | |

OTHER PUBLICATIONS

Extended European Search Report for European Application No. 20914098.7 issued Oct. 17, 2022. 8 pages.
3GPP TSG RAN Meeting #77—RP-171855—Sapporo, Japan, Sep. 11-14, 2017—OPPO, Considerations on NR eMBB UE features in Phase-1 (3 pages).
International Search Report issued Oct. 12, 2020 of PCT/CN2020/072525 (6 pages).
First Office Action of the Chinese application No. 202211142536.8, issued on May 12, 2024. 13 pages with English translation.

* cited by examiner

DATA TRANSMISSION METHOD, ELECTRONIC DEVICE, AND STORAGE MEDIUM

CROSS-REFERENCE TO RELATED APPLICATION

This application is a continuation application of International Application No. PCT/CN2020/072525, filed on Jan. 16, 2020, the entire disclosure of which is hereby incorporated by reference.

TECHNICAL FIELD

The present application relates to the field of wireless communication technology, and in particular to a method for data transmission, an electronic device and a storage medium.

BACKGROUND

A Multimedia Broadcast Multicast Service (MBMS) is a technology of transmitting data from one data source to multiple users through shared network resources. This technology may effectively utilize network resources while providing multimedia services, realizing broadcast and multicast of multimedia services at a relatively high rate (e.g., 256 kbps).

In a New Radio (NR) system, many scenarios need to support the service requirements of multicast and broadcast, e.g., in the Internet of Vehicles, the Industrial Internet, etc. Therefore, it is necessary to introduce MBMS into the NR. After the introduction of MBMS into the NR system, how to improve the efficiency of data transmission is a problem that needs to be solved.

SUMMARY

Implementations of the present application provide a method for data transmission, an electronic device and a storage medium, including: in a case that a first condition is met, receiving, by a terminal device, first data and second data simultaneously, the first data being carried on a PDSCH, and the second data being carried on a second PDSCH.

In a first aspect, an implementation of the present application provides a method for data transmission, including: sending, by a network device, first data and second data to a terminal device; and in the case that a first condition is met, the first data and the second data being received by the terminal device simultaneously.

In a second aspect, an implementation of the present application provides a method for data transmission, including: sending, by a network device, first data and second data to a terminal device; and in the case that a first condition is met, the first data and the second data being received by the terminal device simultaneously.

In a third aspect, an implementation of the present application provides a terminal device, including: a receiving unit configured to simultaneously receive first data and second data in the case that a first condition is met, the first data being carried on a first PDSCH, and the second data being carried on a second PDSCH.

In a fourth aspect, an implementation of the present application provides a network device, including: a sending unit configured to send first data and second data to a terminal device;

in the case that a first condition is met, the first data and the second data being received by the terminal device simultaneously.

In a fifth aspect, an implementation of the present application provides a terminal device, including a processor, and a memory configured to store a computer program that is runnable on the processor, wherein the processor is configured to perform acts of the method for data transmission performed by the above terminal device, when the computer program is run.

In a sixth aspect, an implementation of the present application provides a network device, including a processor, and a memory configured to store a computer program that is runnable on the processor, wherein the processor is configured to perform acts of the method for data transmission performed by the above network device, when the computer program is run.

In a seventh aspect, an implementation of the present application provides a chip, including: a processor configured to call and run a computer program from a memory to cause a terminal device installed with the chip to perform the above method for data transmission.

In an eighth aspect, an implementation of the present application provides a chip, including: a processor configured to call and run a computer program from a memory to cause a network device installed with the chip to perform the above method for data transmission.

In a ninth aspect, an implementation of the present application provides a storage medium, storing an executable program, when the executable program is executed by a processor, the method for data transmission performed by the above terminal device being implemented.

In a tenth aspect, an implementation of the present application provides a storage medium, storing an executable program, when the executable program is executed by a processor, the method for data transmission performed by the above network device being implemented.

In an eleventh aspect, an implementation of the present application provides a computer program product, including computer program instructions that cause a computer to perform the method for data transmission performed by the above terminal device.

In a twelfth aspect, an implementation of the present application provides a computer program product, including computer program instructions that cause a computer to perform the method for data transmission performed by the above network device.

In a thirteenth aspect, an implementation of the present application provides a computer program, which causes a computer to perform the method for data transmission performed by the above terminal device.

In a fourteenth aspect, an implementation of the present application provides a computer program, which causes a computer to perform the method for data transmission performed by the above network device.

The method for data transmission provided by an implementation of the present application includes: in the case that a first condition is met, receiving, by a terminal device, first data and second data simultaneously, the first data being carried on a first PDSCH, and the second data being carried on a second PDSCH. In this way, the terminal device can simultaneously receive data carried by two different channels, thus improving the efficiency of data transmission.

DETAILED DESCRIPTION

Figure 1A:
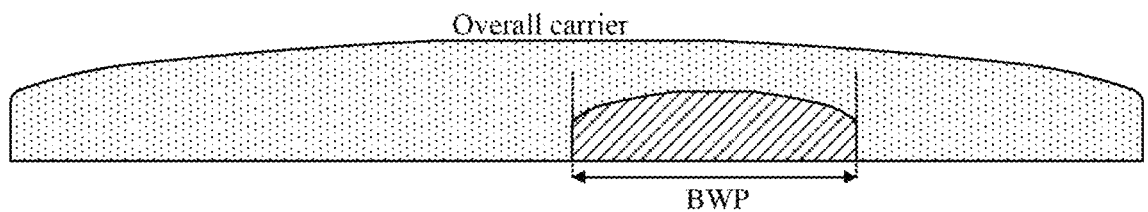
FIG. 1A is a first schematic diagram of bandwidth allocation according to the present application.

In order to understand features and technical contents of implementations of the present application in more detail, implementation of the implementations of the present application will be described in detail below in combination with accompanying drawings, which are for reference and description only, and are not intended to limit the implementations of the present application.

Before description is made on a method for data transmission according to an implementation of the present application, a brief description is made first on the related art.

At present, with people's pursuit of speed, delay, high-speed mobility and energy efficiency, and diversity and complexity of services in the future life, the 3rd Generation Partnership Project (3GPP) International Organization for Standard has begun to research and develop the 5th-generation (5G) communication. Main application scenarios of the 5G are: Enhance Mobile Broadband (eMBB), Ultra Reliable Low Latency Communications (URLLC), and Massive Machine Type Communication (mMTC).

The eMBB still aims at enabling users to obtain multi-media contents, services and data, and the demands thereof are growing very rapidly. On the other hand, the eMBB may be deployed in different scenarios, e.g., an indoor scenario, an urban district, a rural area, etc., with widely varying capabilities and requirements, which cannot be generalized, but shall be analyzed in detail in combination with specific deployment scenarios. Typical applications of the URLLC include: industrial automation, power automation, telemedicine operation (surgery), traffic safety guarantee, etc. Typical characteristics of the mMTC include: a high connection density, a small data volume, a latency-insensitive service, a low cost and a long service life of modules, etc.

An NR system may also be deployed independently. In order to reduce air interface signaling, quickly resume a wireless connection and quickly resume a data service, a new Radio Resource Control (RRC) state, i.e., an RRC-Inactive state, is defined. In an RRC_Idle state, mobility is a terminal device-based cell reselection, paging is initiated by a Core Network (CN), and a paging area is configured by the CN. There is neither terminal device context nor RRC connection on the network device side. In an RRC_Inactive state, mobility is a terminal device-based cell reselection, there is a connection between a CN and an NR, there is a terminal device context on a certain network device, paging is triggered by a Radio Access Network (RAN), an RAN-based paging area is managed by the RAN, and the location of the terminal device that can be known by the network device is on a level of the RAN-based paging area. In an RRC-Connected state, there is an RRC connection, there is a terminal device context between the network device and the terminal device, and the location of the terminal device known by the network device is on a level of specific cell; and mobility is the mobility controlled by the network device, and unicast data may be transmitted between the network device and the terminal device.

Figure 1B:
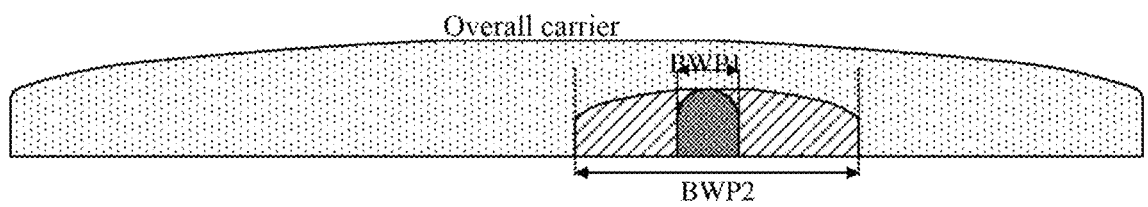
FIG. 1B is a second schematic diagram of bandwidth allocation according to the present application.
Figure 1C:
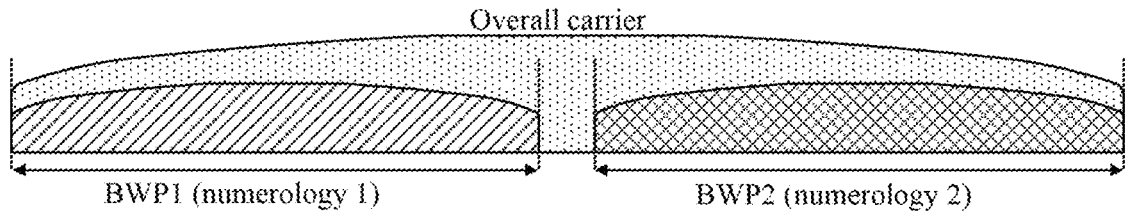
FIG. 1C is a third schematic diagram of bandwidth allocation according to the present application.

In the NR system, the maximum channel bandwidth (wideband carrier) may be 400 MHz, which is much larger than the maximum bandwidth of 20 MHz in an LTE system. If a terminal device keeps working on a wideband carrier, a lot of power will be consumed. Therefore, it is suggested that the RF bandwidth of the terminal device be adjustable according to an actual throughput of the terminal device. In order to optimize the power consumption of the terminal device, a BandWidth Part (BWP) is introduced, as shown in the schematic diagram of bandwidth allocation in FIG. 1A. If the rate requirement of the terminal device is very low, a small bandwidth may be configured for the terminal device, such as BWP1 shown in FIG. 1B; if the rate requirement of the terminal device is very high, a slightly larger bandwidth may be configured for the terminal device, such as BWP2 shown in FIG. 1B; and if the terminal device supports a high rate or if the terminal device works in a Carrier Aggregation (CA) mode, multiple BWPs may be configured for the terminal device, as shown in the schematic diagram of bandwidth allocation in FIG. 1C. The terminal device in the RRC-Idle state or the RRC-Inactive state resides on an initial BWP, which is visible to the terminal device in the RRC-Idle state or the RRC-Inactive state. In the initial BWP, a Master Information Block (MIB), Remaining Minimum System Information (RMSI), Other System Information (OSI), paging and other information may be acquired.

Since the MBMS in 3GPP Release 6 (Rel-6) has a relatively low spectrum efficiency, which is not sufficient to effectively carry and support the operation of mobile TV type services, in the LTE system, 3GPP explicitly proposes to enhance the support capability for a downlink high-speed multimedia broadcast multicast service, and determines the design requirements of a physical layer and an air interface.

Enhanced MBMS (eMBMS) is introduced into an LTE network in 3GPP Release 9 (Rel-9), and eMBMS puts forward a concept of Single Frequency Network (SFN), i.e., using a unified frequency to send data in all cells at the same time, but synchronization of information among the cells need to be ensured. In this way, the overall signal-to-noise ratio distribution of the cell may be greatly improved, and the spectrum efficiency may be greatly improved.

Figure 2:
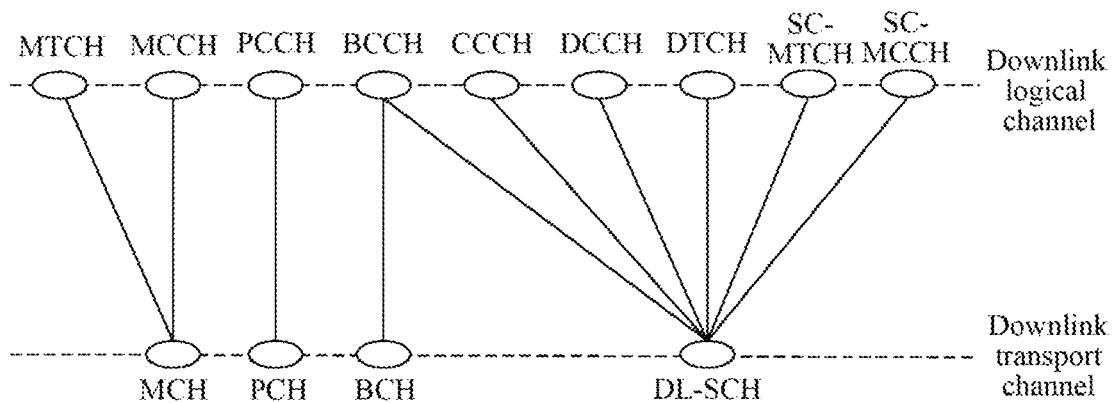
FIG. 2 is a schematic diagram of SC-MCCH and SC-MTCH mapping to a downlink shared transmission channel according to the present application.

In LTE/LTE-A, MBMS only has a broadcast carrying mode, but does not have a multicast carrying mode; and the reception of an MBMS service is applicable to the terminal device in the RRC-Idle state and the RRC-Connected state. In 3GPP Release 13 (Rel-13), a concept of Single Cell Point to Multipoint (SC-PTM) is introduced; and new logic channels, i.e., a Single Cell Multicast Control Channel (SC-MCCH) and a Single Cell Multicast Transport Channel (SC-MTCH), are introduced. As shown in FIG. 2, SC-MCCH and SC-MTCH may be mapped to a downlink shared transmission channel, such as PDSCH. SC-MCCH and SC-MTCH do not support a Hybrid Automatic Repeat reQuest (HARQ) operation.

In Rel-13, a new SIB type, SIB20, is further introduced. SIB20 is used for transmitting configuration information of SC-MCCH, and there is only one SC-MCCH for one cell. The configuration information of SC-MCCH includes: a modification period and a repetition period of SC-MCCH, configuration information of a radio frame and configuration information of a sub-frame.

The configuration information of SC-PTM includes: Temporary Mobile Group Identity (TMGI). Optionally, the configuration information of SC-PTM may also include: a session ID, a Group RNTI (G-RNTI), SC-PTM Discontinuous Reception (DRX) configuration information, and SC-PTM service information of a neighbor cell.

In the related art, a terminal device does not expect that two PDSCHs scheduled by a network device overlap in a time domain, that is, the network device only schedules one PDSCH for the terminal device at one time. However, the applicant has found that after the introduction of an MBMS service, the terminal device may work under a unicast service and a multicast broadcast service at the same time. In such a scenario, there is no effective solution on how to perform data transmission in order to improve the efficiency of data transmission.

Based on the above problem, an implementation of the present application provides a method for data transmission. The method for data transmission according to an implementation of the present application may be applied to various communication systems, such as a global system of mobile communication (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), a worldwide interoperability for microwave access (WiMAX) communication system, wireless local area networks (WLAN), wireless fidelity (WiFi), a next generation communication system, or another communication system, etc.

Generally speaking, the traditional communication system supports a limited quantity of connections, and is also easy to implement. However, with the development of communication technology, the mobile communication system will not only support traditional communication, but also support, for example, device to device (D2D) communication, machine to machine (M2M) communication, the machine type communication (MTC), vehicle to vehicle (V2V) communication, etc., and the implementations of the present application may also be applied to these communication systems.

System architectures and service scenarios described in the implementations of the present application are intended to illustrate the technical solutions of the implementations of the present application more clearly, and do not constitute a limitation to the technical solutions provided by the implementations of the present application. Those of ordinary skills in the art may know that with evolvement of network architectures and emergence of new service scenarios, the technical solutions provided by the implementations of the present application are also applicable to similar technical problems.

The network device involved in an implementation of the present application may be an ordinary base station (such as a NodeB, or an eNB, or a gNB), a new radio controller (NR controller), a centralized unit, a new radio base station, a radio remote module, a micro base station, a relay, a distributed unit, a transmission reception point (TRP), a transmission point (TP), or any other device. An implementation of the present application does not limit the specific technology and the specific device form adopted by the network device. For convenience of description, in all implementations of the present application, the above-mentioned apparatuses for providing wireless communication functions for a terminal device are collectively referred to as a network device.

In an implementation of the present application, a terminal device may be any terminal, for example, the terminal device may be a user device for machine type communication. That is, the terminal device may also be referred to as User Equipment (UE), a mobile station (MS), a mobile terminal, a terminal, etc., which may communicate with one or more core networks via a radio access network (RAN). For example, the terminal device may be a mobile phone (or "cellular" phone), a computer with a mobile terminal, etc. For example, terminal devices may also be portable, pocket-size, handheld, computer-built or vehicle-mounted mobile apparatuses that exchange speech and/or data with wireless access networks. No specific limitations are made in the implementations of the present application.

Optionally, the network device and the terminal device may be deployed on land, including indoors or outdoors, hand-held or vehicle-mounted; or may be deployed on a water surface; or may be deployed on a plane, a balloon, or a satellite in the air. The implementations of the present application do not limit application scenarios of the network device and the terminal device.

Optionally, communications between a network device and a terminal device and between terminal devices may be performed through a licensed spectrum, or an unlicensed spectrum, or both, at the same time. Communications between a network device and a terminal device and between terminal devices may be performed through a spectrum below 7 gigahertz (GHz), or through a spectrum above 7 GHz, or using both a spectrum below 7 GHz and a spectrum above 7 Ghz. The implementations of the present application do not limit spectrum resources used between a network device and a terminal device.

Generally speaking, the traditional communication system supports a limited quantity of connections, and is also easy to implement. However, with the development of communication technology, the mobile communication system will not only support traditional communication, but also support, for example, device to device (D2D) communication, machine to machine (M2M) communication, the machine type communication (MTC), vehicle to vehicle (V2V) communication, etc., and the implementations of the present application may also be applied to these communication systems.

Figure 3:
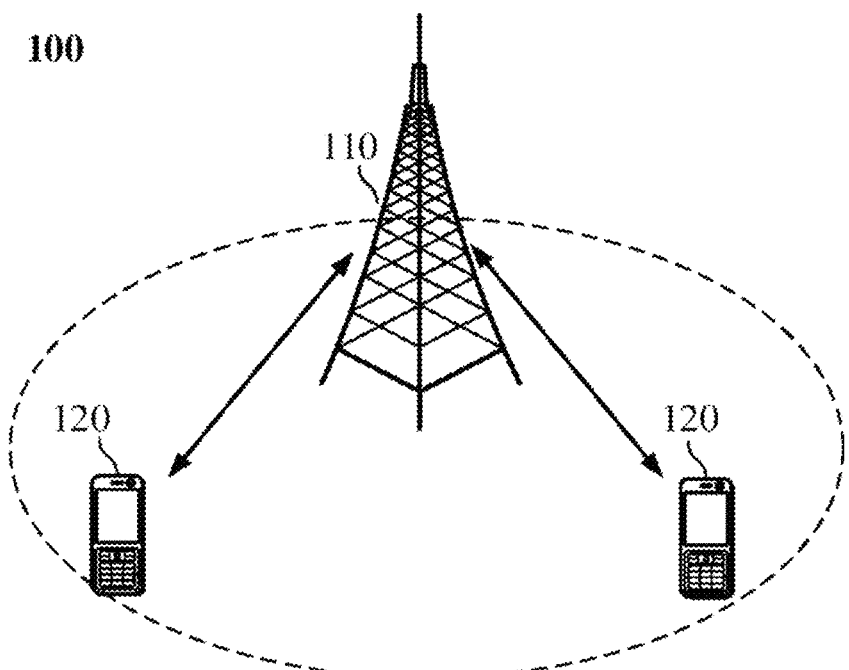
FIG. 3 is a schematic diagram of a communication system according to an implementation of the present application.

Illustratively, a communication system 100 to which an implementation of the present application is applied is shown in FIG. 3. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a radio controller in a Cloud Radio Access Network (CRAN); or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage range of the network device 110. As used herein, the term "terminal device" includes, but is not limited to, a device configured to connect via a wired line, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a DVB-H network, a satellite network, and an AM-FM broadcast transmitter; and/or an apparatus, of another terminal device, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communications System (PCS) terminal capable of combining a cellular wireless telephone and data processing, faxing, and data communication abilities, a PDA that may include a radio telephone, a pager, an internet/intranet access, a Web browser, a memo pad, a calendar, and/or a Global Positioning System (GPS) receiver, and a conventional laptop and/or palmtop receiver or another electronic apparatus including a radio telephone transceiver. The terminal device may refer to an access terminal, User Equipment (UE), a subscriber unit, a subscriber station, a mobile station, a rover station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN, or the like.

Optionally, Device to Device (D2D) communication may be performed between the terminal devices 120.

Optionally, the 5G system or 5G network may also be referred to as a New Radio (NR) system or an NR network.

Figure 4:
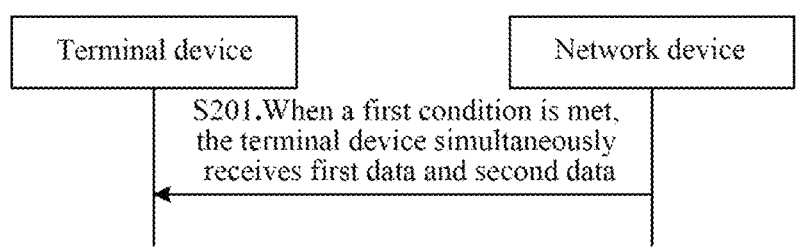
FIG. 4 is a schematic diagram of an optional processing flow of a method for data transmission according to an implementation of the present application.

An optional processing flow of a method for data transmission provided by an implementation of the present application, as shown in FIG. 4, includes act S201.

In act S201, in a case that a first condition is met, a terminal device receives first data and second data simultaneously.

In some implementations, the first data is carried on a first PDSCH, and a network device schedules a first PDSCH resource through first DCI; the second data is carried on a second PDSCH, and the network device schedules a second PDSCH resource through second DCI; and the first PDSCH and the second PDSCH overlap in a time domain.

In some implementations, the first condition includes at least one of: a Demodulation Reference Signal (DMRS) of the first PDSCH being Type D quasi-co-location (QCL-TypeD) with DMRS of the second PDSCH; DMRS of the first PDSCH and DMRS of the second PDSCH being QCL-TypeD with a same Channel Status Indicator Reference Signal (CSI-RS) resource; DMRS of the first PDSCH and DMRS of the second PDSCH being QCL-TypeD with a same Tracking Reference Signal (TRS) resource; DMRS of the first PDSCH and DMRS of the second PDSCH being QCL-TypeD with a same Physical Broadcast Channel (PBCH) resource; and DMRS of the first PDSCH and DMRS of the second PDSCH being QCL-TypeD with a same Synchronization Signal Block (SSB). The synchronization signal block is composed of a primary synchronization signal, a secondary synchronization signal and PBCH.

In this scenario, the terminal device may receive the first data and the second data using a same Spatial RX parameter. The parameters used by the terminal device to receive data are described below based on FIGS. 5 and 6.

Figure 5:
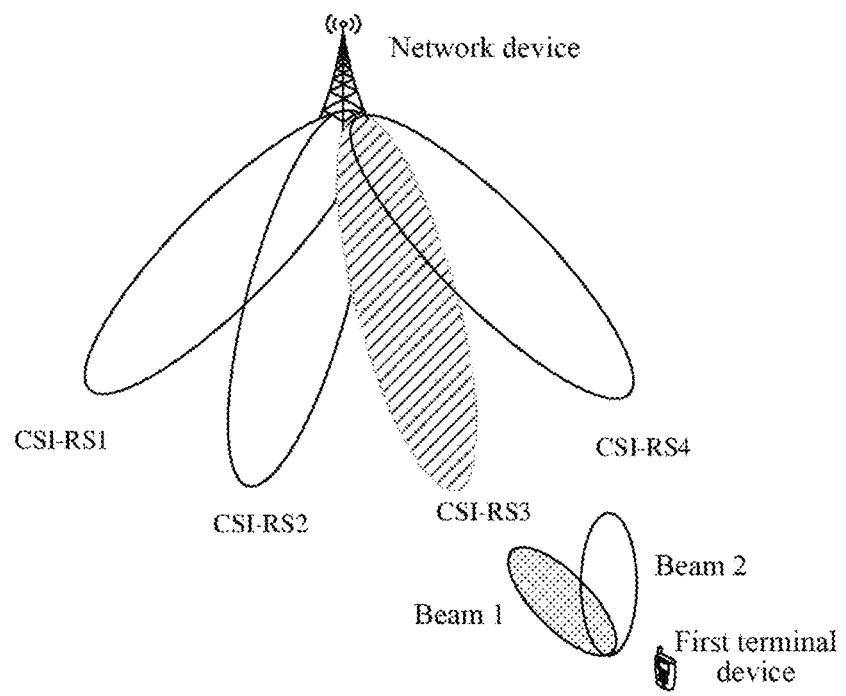
FIG. 5 is a schematic diagram of a network device determining an optimal sending beam direction of a terminal device according to an implementation of the present application.

In the NR system, data transmission based on beamforming is supported, the network device may send data using different beam directions, and the terminal device supports one beam direction (when a carrier frequency is FR1) or multiple beam directions (when the carrier frequency is FR2). The beam direction is associated with a CSI-RS resource, SSB, a PBCH resource or a TRS resource. For example, the network device uses different beams to send different CSI-RS resources, the terminal device measures CSI-RS to acquire Reference Signal Received Power (RSRP), selects a CSI-RS resource index corresponding to the maximum value of RSRP and reports it to the network device. According to the CSI-RS resource index reported by the terminal device, the network device may know the optimal sending beam direction of the terminal device. As shown in FIG. 5, the network device supports four beam directions, and the network device sends different CSI-RS resources in different beam directions; and a first terminal device receives four CSI-RS respectively using a fixed beam and performs RSRP measurement. If the RSRP value corresponding to a CSI-RS3 resource is the highest, the first terminal device reports a resource index corresponding to the CSI-RS3 to the network device; and the network device may know that the beam direction corresponding to the CSI-RS3 resource is the optimal sending beam direction for the terminal device.

When receiving CSI-RS sent by the network device in different beam directions, the terminal device usually uses a fixed receiving beam, e.g., beam 1 shown in FIG. 5. Therefore, when the terminal device reports the CSI-RS3 corresponding to the maximum value of RSRP to the network device, it is acquired based on beam 1. Furthermore, during the subsequent transmission of PDSCH by the network device, if a Transmission Configuration Indicator (TCI) state indicated in the DCI for scheduling the PDSCH is the same as the TCI state included in the configuration information of the CSI-RS3, the terminal device considers that DMRS of the PDSCH may be received using beam 1.

Figure 6:
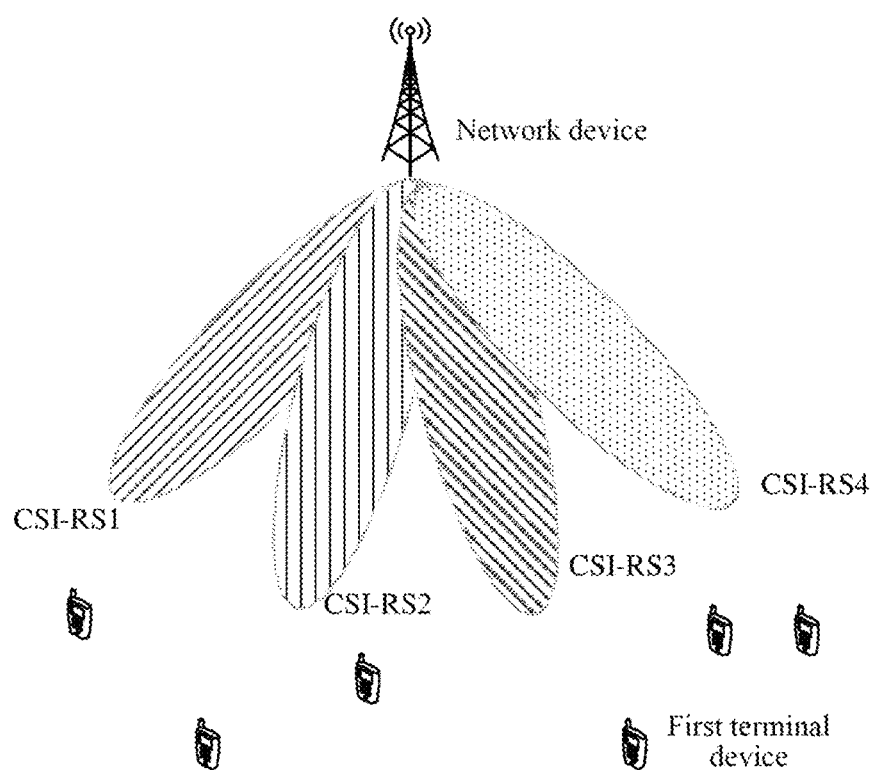
FIG. 6 is a schematic diagram of a network device sending a PDSCH carrying an MBMS service by using different beam directions according to an implementation of the present application.

Since the service carried by PDSCH1 or PDSCH2 may be an MBMS service, and the receiving end of the MBMS service is a group of terminal devices or all terminal devices in a cell, the network device may repeatedly send PDSCH carrying the MBMS service by means of beam scanning. As shown in FIG. 6, the network device sends PDSCH carrying an MBMS service using different beam directions.

When PDSCH1 carrying an MBMS service that is scheduled by the network device and PDSCH2 carrying a unicast service that is sent by the network device to the first terminal device overlap in a time domain, DMRS of PDSCH1 is QCL-TypeD with the CSI-RS3 resource; moreover, DMRS of PDSCH2 is QCL-TypeD with the CSI-RS3 resource. Alternatively, the TCI state indicated in DCH for scheduling PDSCH1 is the same as the TCI state in the CSI-RS3 configuration information, and the TCI state indicated in DCI2 for scheduling PDSCH2 is the same as the TCI state in the CSI-RS3 configuration information. In view of this, the first terminal device may simultaneously receive PDSCH1 and PDSCH2 using beam 1.

In some other implementations, the first condition includes: a slot difference between a slot carrying the first PDSCH and a slot carrying a Hybrid Automatic Repeat reQuest ACK (HARQ-ACK) corresponding to the first PDSCH being greater than a value of first threshold; and/or, a slot difference between a slot carrying the second PDSCH and a slot carrying HARQ-ACK corresponding to the second PDSCH being greater than a value of second threshold.

The value of first threshold and/or the value of second threshold may be configured by the network device, and the value of first threshold and/or the value of second threshold may be determined according to the processing capability of the terminal device. The value of first threshold and/or the value of second threshold are used to define a range of a value indicated by indication information "PDSCH-to-HARQ_feedback timing indicator" carried in the DCI for scheduling PDSCH. The value of first threshold may be carried in the DCI for scheduling the first physical downlink shared channel (PDSCH) by the network device; and the value of second threshold may be carried in the DCI for scheduling the second PDSCH by the network device. The value of first threshold and the value of second threshold may be the same or different.

For example, when the network device schedules PDSCH1 through DCI, the indication information "PDSCH-to-HARQ_feedback timing indicator" is carried in the DCI to indicate a slot difference between a slot carrying PDSCH1 and a slot carrying PUCCH or PUSCH of HARQ-ACK corresponding to PDSCH1. The time difference may have a value selected from {1, 2, 3, 4, 5, 6, 7, 8} or may be determined according to the network configuration parameter dl-DataToUL-ACK. The network configuration parameter dl-DataToUL-ACK has a value range of [0, 15]. If the terminal device receives two PDSCHs at the same time, the slot difference corresponding to the indication information "PDSCH-to-HARQ_feedback timing indicator" in the DCI for scheduling PDSCH1 is greater than the value of first threshold K0. If the value of first threshold K0 is equal to 4, the value range of "PDSCH-to-HARQ_feedback timing indicator" is defined so that the slot difference determined according to the parameter is greater than 4 slots. For example, the indication information "PDSCH-to-HARQ_feedback timing indicator" in the DCI has a value of {1, 2, 3, 4, 5, 6, 7, 8}; and the value of first threshold K0 configured by the network device is equal to 4, therefore, the slot difference corresponding to the value of the indication information can only be 5, 6, 7 or 8.

In the case that the slot difference between the slot carrying the first PDSCH and the slot carrying the HARQ-ACK corresponding to the first PDSCH is greater than the value of first threshold, and/or the slot difference between the slot carrying the second PDSCH and the slot carrying the HARQ-ACK corresponding to the second PDSCH is greater than the value of second threshold, the terminal device can have sufficient processing time to receive two PDSCHs simultaneously.

In still some other implementations, the first condition includes: a maximum value of a slot range between the slot carrying the first PDSCH and a first PUCCH corresponding to the first PDSCH being greater than a first value; and/or, a maximum value of a slot range between the slot carrying the second PDSCH and a second PUCCH corresponding to the second PDSCH being greater than a second value. The first PUCCH carries HARQ-ACK information corresponding to the first PDSCH; and the second PUCCH carries HARQ-ACK information corresponding to the second PDSCH. In specific implementation, the first value and the second value may be 15; or, the first value and the second value may be different values, for example, the first value is 20 and the second value is 25.

The slot range between the slot carrying the first PDSCH and the first PUCCH corresponding to the first PDSCH, and the slot range between the slot carrying the second PDSCH and the second PUCCH corresponding to the second PDSCH may both be indicated by the parameter dl-DataToUL-ACK configured by the network device.

In an implementation of the present application, in the case that the maximum value of the slot range between the slot carrying the first PDSCH and the first PUCCH corresponding to the first PDSCH is greater than the first value; and/or, the maximum value of the slot range between the slot carrying the second PDSCH and the second PUCCH corresponding to the second PDSCH is greater than the second value, the terminal device can have sufficient processing time to receive two PDSCHs simultaneously.

It should be noted that in an implementation of the present application, the first data may be one of: unicast data, multicast data, broadcast data, system information and paging messages; the second data may be one of: unicast data, multicast data, broadcast data, system information and paging messages; the first data and the second data may both be MBMS data; or one of them is MBMS data and the other is unicast data; or the first data and the second data may both be unicast data, i.e., the transmission types of the first data and the second data are not limited in an implementation of the present application.

Figure 7:
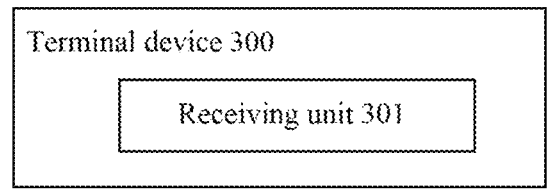
FIG. 7 is a schematic diagram of a composition structure of a terminal device according to an implementation of the present application.

In order to implement the method for data transmission according to an implementation of the present application, an implementation of the present application provides a terminal device. A composition structure of the terminal device 300, as shown in FIG. 7, includes a receiving unit 301.

The receiving unit 301 is configured to simultaneously receive first data and second data in the case that a first condition is met,
the first data being carried on a first PDSCH, and the second data being carried on a second PDSCH.

In some implementations, the first condition includes at least one of:

DMRS of the first PDSCH being Type D quasi-co-location with DMRS of the second PDSCH;

DMRS of the first PDSCH and DMRS of the second PDSCH being Type D quasi-co-location with a same CSI-RS resource;

DMRS of the first PDSCH and DMRS of the second PDSCH being Type D quasi-co-location with a same TRS resource;

DMRS of the first PDSCH and DMRS of the second PDSCH being Type D quasi-co-location with a same PBCH resource; and DMRS of the first PDSCH and DMRS of the second PDSCH being Type D quasi-co-location with a same SSB.

In some implementations, the first condition includes:
a slot difference between a slot carrying the first PDSCH and a slot carrying HARQ-ACK corresponding to the first PDSCH being greater than a value of first threshold;
and/or, a slot difference between a slot carrying the second PDSCH and a slot carrying HARQ-ACK corresponding to the second PDSCH being greater than a value of second threshold.

In some implementations, the value of first threshold and/or the value of second threshold are configured by a network device.

In some implementations, the value of first threshold and/or the value of second threshold are determined according to a processing capability of the terminal device.

In some implementations, the first condition includes: a maximum value of a slot range between the slot carrying the first PDSCH and a first PUCCH corresponding to the first PDSCH being greater than a first value; and/or, a maximum value of a slot range between the slot carrying the second PDSCH and a second PUCCH corresponding to the second PDSCH being greater than a second value.

In some implementations, both the first value and the second value are equal to 15.

In some implementations, the receiving unit is configured to receive the first data and the second data using a same spatial RX parameter.

In some implementations, the first PDSCH and the second PDSCH overlap in a time domain.

Figure 8:
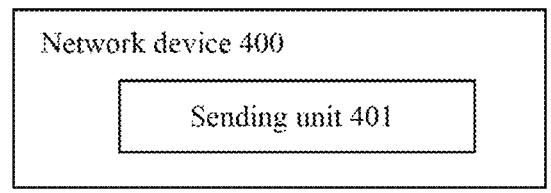
FIG. 8 is a schematic diagram of a composition structure of a network device according to an implementation of the present application.

In order to implement the method for data transmission according to an implementation of the present application, an implementation of the present application provides a network device. A composition structure of the network device 400, as shown in FIG. 8, includes a sending unit 401.

The sending unit 401 is configured to send first data and second data to a terminal device;
in the case that a first condition is met, the first data and the second data being simultaneously received by the terminal device.

In some implementations, the first condition includes at least one of:
a Demodulation Reference Signal (DMRS) of the first PDSCH being Type D quasi-co-location with DMRS of the second PDSCH;

DMRS of the first PDSCH and DMRS of the second PDSCH being Type D quasi-co-location with a same CSI-RS resource;

DMRS of the first PDSCH and DMRS of the second PDSCH being Type D quasi-co-location with a same TRS resource;

DMRS of the first PDSCH and DMRS of the second PDSCH being Type D quasi-co-location with a same PBCH resource; and DMRS of the first PDSCH and DMRS of the second PDSCH being Type D quasi-co-location with a same SSB.

In some implementations, the first condition includes: a slot difference between a slot carrying the first PDSCH and a slot carrying HARQ-ACK corresponding to the first PDSCH being greater than a value of first threshold; and/or, a slot difference between a slot carrying the second PDSCH and a slot carrying HARQ-ACK corresponding to the second PDSCH being greater than the value of first threshold.

In some implementations, the value of first threshold is carried in DCI for scheduling the first PDSCH by the network device; and/or the value of first threshold is carried in DCI for scheduling the second PDSCH by the network device.

In some implementations, the value of first threshold is determined according to a processing capability of the terminal device.

In some implementations, the first condition includes: a maximum value of a slot range between the slot carrying the first PDSCH and a first PUCCH corresponding to the first PDSCH being greater than a first value; and/or, a maximum value of a slot range between the slot carrying the second PDSCH and a second PUCCH corresponding to the second PDSCH being greater than the first value.

In some implementations, the first value is equal to 15.

In some implementations, the first PDSCH and the second PDSCH overlap in a time domain.

An implementation of the present application further provides a terminal device, including a processor, and a memory configured to store a computer program that is runnable on the processor, wherein the processor is configured to perform acts of the method for data transmission performed by the above terminal device, when the computer program is run.

An implementation of the present application further provides a network device, including a processor, and a memory configured to store a computer program that is runnable on the processor, wherein the processor is configured to perform acts of the method for data transmission performed by the above network device, when the computer program is run.

Figure 9:
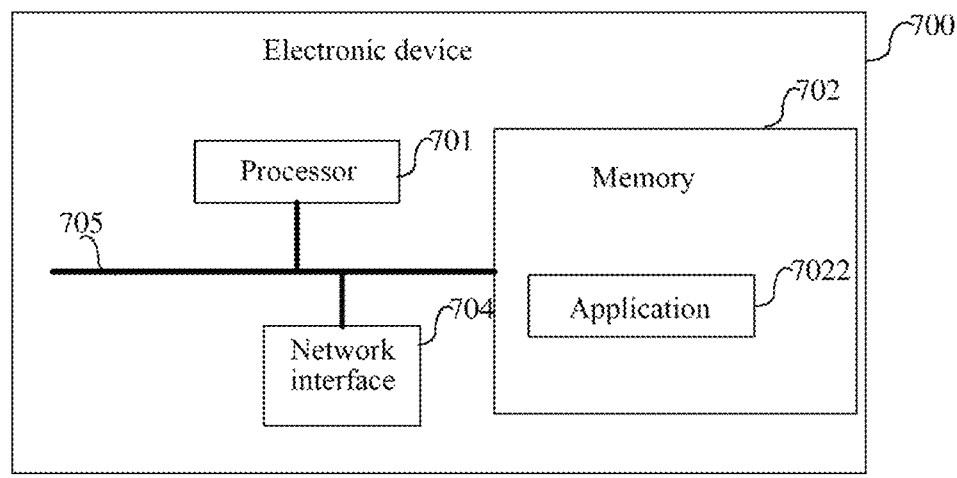
FIG. 9 is a schematic diagram of a hardware composition structure of an electronic device according to an implementation of the present application.

FIG. 9 is a schematic diagram of a hardware composition structure of an electronic device according to an implementation of the present application. The electronic device 700 includes: at least one processor 701, a memory 702, and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity, all kinds of buses are uniformly denoted as the bus system 705 in FIG. 9.

It may be understood that the memory 702 may be a volatile memory or a non-volatile memory, or may include both a volatile memory and a non-volatile memory. The non-volatile memory may be a ROM, a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM). The magnetic surface memory may be a magnetic disk memory or a magnetic tape memory. The volatile memory may be a Random Access Memory (RAM) which serves as an external cache. By way of illustrative but not restrictive explanation, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 702 described in an implementation of the present application is intended to include, but is not limited to, these and any other suitable types of memories.

The memory 702 in an implementation of the present application is configured to store various types of data to support an operation of the electronic device 700. Examples of such data include any computer program for operating on the electronic device 700, such as an application 7022. A program for implementing the method of an implementation of the present application may be contained in the application 7022.

Methods disclosed in the above implementations of the present application may be applied to the processor 701, or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above processor 701 may be a general purpose processor, a Digital Signal Processor (DSP), or other programmable logic devices, a discrete gate or transistor logic device, a discrete hardware component, etc. The processor 701 may implement or execute various methods, acts, and logical block diagrams disclosed in the implementations of the present application. The general purpose processor may be a microprocessor or any conventional processor or the like. The acts of the methods disclosed in an implementation of the present application may be directly embodied to be executed by a hardware decoding processor, or executed by a combination of hardware in the decoding processor and software modules. The software modules may be located in a storage medium, and the storage medium is located in the memory 702. The processor 701 reads information in the memory 702 and accomplishes the acts of the aforementioned methods in combination with hardware thereof.

In an exemplary implementation, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs or other electronic components, for executing the aforementioned methods.

An implementation of the present application further provides a storage medium configured to store a computer program.

Optionally, the storage medium may be applied to a terminal device in an implementation of the present application, and the computer program enables a computer to perform a corresponding flow in each method performed by a terminal device in an implementation of the present application, which will not be repeated here for brevity.

Optionally, the storage medium may be applied to a network device in an implementation of the present application, and the computer program enables a computer to perform a corresponding flow in each method performed by a network device in an implementation of the present application, which will not be repeated here for brevity.

An implementation of the present application further provides a chip, including: a processor configured to call and run a computer program from a memory to cause a terminal device installed with the chip to perform the above method for data transmission.

An implementation of the present application further provides a chip, including: a processor configured to call and run a computer program from a memory to cause a network device installed with the chip to perform the above method for data transmission.

An implementation of the present application further provides a computer program product, including computer program instructions that cause a computer to perform the method for data transmission performed by the above terminal device.

An implementation of the present application further provides a computer program product, including computer program instructions that cause a computer to perform the method for data transmission performed by the above network device.

An implementation of the present application further provides a computer program, which causes a computer to perform the method for data transmission performed by the above terminal device.

An implementation of the present application further provides a computer program, which causes a computer to perform the method for data transmission performed by the above network device.

The present application is described with reference to flowcharts and/or block diagrams of methods, devices (systems), and computer program products according to implementations of the present application. It should be understood that each flow and/or block in the flowchart and/or the block diagram, and combinations of flows and/or blocks in the flowchart and/or the block diagram may be implemented by computer program instructions. These computer program instructions may be provided to a processor of a general purpose computer, a special purpose computer, an embedded processor or another programmable data processing device to produce a machine, such that instructions which are executed by a processor of a computer or another programmable data processing device produce an apparatus for implementing a function specified in one or more flows in a flowchart and/or one or more blocks in a block diagram.

These computer program instructions may also be stored in a computer-readable memory that can direct a computer or another programmable data processing device to operate in a particular manner, such that instructions stored in the computer-readable memory produce an article of manufacture including an instruction apparatus, wherein the instruction apparatus implements a function specified in one or more flows in the flowchart and/or one or more blocks in the block diagram.

These computer program instructions may also be loaded onto a computer or another programmable data processing device to cause a series of operational acts to be performed on the computer or another programmable device to produce computer-implemented processing, such that instructions executed on the computer or the another programmable device provide acts for implementing a function specified in one or more flows in the flowchart and/or one or more blocks in the block diagram.

It should be understood that the terms "system" and "network" in the present application are often used interchangeably herein. The term "and/or" in the present application describes an association relation between associated objects only, indicating that there may be three relations, for example, A and/or B may indicate three cases: A alone, both A and B, and B alone. In addition, the symbol "/" in the present application generally indicates that there is a "or" relationship between the associated objects before and after "/".

The above descriptions are only preferred implementations of the present application, which are not intended to limit the protection scope of the present application. Any modification, equivalent substitution, improvement, etc. made within the spirit and the principle of the present application shall all be contained within the protection scope of the present application.

What is claimed is:

1. A method for data transmission, comprising:
in a case that a first condition is met, receiving, by a terminal device, first data and second data simultaneously;
the first data being carried on a first physical downlink shared channel (PDSCH), and the second data being carried on a second PDSCH;
wherein the first condition comprises:
Demodulation Reference Signal (DMRS) of the first PDSCH and DMRS of the second PDSCH being QCL-TypeD with a same Synchronization Signal Block (SSB);
wherein the first data is a Multimedia Broadcast Multicast Service (MBMS) data, and the second data is a unicast data.

2. The method according to claim 1, wherein the first condition further comprises:
a slot difference between a slot carrying the first PDSCH and a slot carrying a Hybrid Automatic Repeat reQuest ACK (HARQ-ACK) corresponding to the first PDSCH being greater than a value of first threshold;
and/or, a slot difference between a slot carrying the second PDSCH and a slot carrying HARQ-ACK corresponding to the second PDSCH being greater than a value of second threshold.

3. The method according to claim 2, wherein the value of the first threshold and/or the value of the second threshold are configured by a network device.

4. The method according to claim 2, wherein the value of the first threshold and/or the value of the second threshold are determined according to a processing capability of the terminal device.

5. The method according to claim 1, wherein the first condition further comprises:
a maximum value of a slot range between a slot carrying the first PDSCH and a first physical downlink control channel (PUCCH) corresponding to the first PDSCH being greater than a first value;
and/or, a maximum value of a slot range between a slot carrying the second PDSCH and a second PUCCH corresponding to the second PDSCH being greater than a second value.

6. The method according to claim 5, wherein the first value is equal to 15.

7. The method according to claim 1, wherein the receiving, by a terminal device, first data and second data simultaneously comprises:
receiving, by the terminal device, the first data and the second data using a same spatial RX parameter.

8. The method according to claim 1, wherein the first PDSCH and the second PDSCH overlap in a time domain.

9. A method for data transmission, comprising:
sending, by a network device, first data and second data to a terminal device;
in a case that a first condition is met, the first data and the second data being received by the terminal device simultaneously;
wherein the first condition comprises:
Demodulation Reference Signal (DMRS) of the first PDSCH and DMRS of the second PDSCH being QCL-TypeD with a same Synchronization Signal Block (SSB);
wherein the first data is a Multimedia Broadcast Multicast Service (MBMS) data, and the second data is a unicast data.

10. The method according to claim 9, wherein the first condition further comprises:
a slot difference between a slot carrying the first PDSCH and a slot carrying a Hybrid Automatic Repeat reQuest ACK (HARQ-ACK) corresponding to the first PDSCH being greater than a value of first threshold;
and/or, a slot difference between a slot carrying the second PDSCH and a slot carrying HARQ-ACK corresponding to the second PDSCH being greater than a value of second threshold.

11. The method according to claim 10, wherein the value of the first threshold is carried in downlink control signaling (DCI) for scheduling the first physical downlink shared channel (PDSCH) by the network device;
and/or, the value of the second threshold is carried in DCI for scheduling the second PDSCH by the network device.

12. The method according to claim 10, wherein the value of the first threshold and/or the value of the second threshold are determined according to a processing capability of the terminal device.

13. The method according to claim 9, wherein the first condition further comprises:
a maximum value of a slot range between a slot carrying the first PDSCH and a first physical downlink control channel (PUCCH) corresponding to the first PDSCH being greater than a first value;
and/or, a maximum value of a slot range between a slot carrying the second PDSCH and a second PUCCH corresponding to the second PDSCH being greater than a second value.

14. The method according to claim 13, wherein the first value and the second value are each equal to 15.

15. The method according to claim 9, wherein the first PDSCH and the second PDSCH overlap in a time domain.

16. A terminal device, comprising a processor, and a memory configured to store a computer program that is runnable on the processor, wherein
the processor is configured to perform acts of the method for data transmission according to claim 1, when the computer program is run.

17. A terminal device, comprising a processor, and a memory configured to store a computer program that is runnable on the processor, wherein
the processor is configured to perform acts of the method for data transmission according to claim 9, when the computer program is run.

* * * * *